United States Patent [19]

Okajima et al.

[11] Patent Number: 4,794,855

[45] Date of Patent: Jan. 3, 1989

[54] CONTINUOUS PRESS MACHINE

[75] Inventors: Kiyonori Okajima; Jugoro Saito, both of Tokyo; Hiroshi Fujiwara, Koshigaya, all of Japan

[73] Assignee: Mitsubishi Rayon Engineering Co., Ltd., Tokyo, Japan

[21] Appl. No.: 61,287

[22] Filed: Jun. 12, 1987

[30] Foreign Application Priority Data

Aug. 5, 1986 [JP] Japan ............................ 61-183907
Aug. 5, 1986 [JP] Japan ............................ 61-183909
Aug. 25, 1986 [JP] Japan ............................ 61-198757

[51] Int. Cl.$^4$ ........................... B30B 5/04; F16J 15/40
[52] U.S. Cl. ............................ 100/154; 100/93 RP; 277/DIG. 7; 156/583.5
[58] Field of Search ............ 100/154, 93 P, 93 RP, 100/211; 425/371; 384/15; 156/282, 311, 497–499, 555, 583.5; 277/3, DIG. 7

[56] References Cited

U.S. PATENT DOCUMENTS

| | | | |
|---|---|---|---|
| 3,839,147 | 10/1974 | Daane | 100/154 X |
| 4,080,234 | 3/1978 | Sundberg | 156/282 X |
| 4,186,797 | 2/1980 | Guttinger et al. | 100/154 X |
| 4,193,342 | 3/1980 | Held | 100/154 |
| 4,354,686 | 10/1982 | Imanishi et al. | 277/DIG. 7 |
| 4,471,964 | 9/1984 | Kotzur | 277/3 |
| 4,483,541 | 11/1984 | Devenyi et al. | 277/3 |
| 4,485,733 | 12/1984 | Held | 100/154 X |
| 4,543,038 | 9/1985 | Kitaguchi | 277/3 X |
| 4,560,172 | 12/1985 | Zimmerman et al. | 277/3 |
| 4,632,722 | 12/1986 | Pankoke | 100/93 RP X |
| 4,659,425 | 4/1987 | Eggers et al. | 156/583.5 |
| 4,670,080 | 6/1987 | Schwarz et al. | 156/583.5 X |

Primary Examiner—Stuart S. Levy
Assistant Examiner—Steven M. duBois
Attorney, Agent, or Firm—Oblon, Fisher, Spivak, McClelland & Maier

[57] ABSTRACT

A continuous press machine includes a pressure applying device for urging a pair of opposed endless belts toward each other to compress a sheet-like material passing therebetween. The pressure applying device includes a stationary housing defining a pressure chamber and having a peripheral edge facing and spaced slightly from a back side surface of each endless belt, and a device for supplying a pressurized urging fluid to each of pressure chambers, so that the pressure in the pressure chamber is applied to the back side surface of each endless belt so as to urge each endless belt against the material. A seal device is provided for sealing a gap between the peripheral edge of each housing and the back side surface of each endless belt facing the peripheral edge, so as to prevent the pressurized urging fluid in the pressure chamber from flowing through the gap. The seal device includes a fluid seal mechanism for continuously applying a pressurized sealing fluid from at least part of the peripheral edge toward the back side surface of each endless belt facing the peripheral edge, so as to provide a fluid seal therebetween.

13 Claims, 4 Drawing Sheets

CONTINUOUS PRESS MACHINE

BACKGROUND OF THE INVENTION

1. Field of the Invention

This invention relates to a continuous pressing machine which can mold a sheet of thermosetting resin reinforced by a paper, cloth, glass fiber or the like, or laminated thermoplastic resin sheets or plywoods.

2. Prior Art

As for a pressing, a batch type press of a single- or multi-daylight process has been used. Materials pressed by this type of press are, for example, papers, clothes, glass fibers or the like impregnated with a liquid thermosetting resin which are pressed at room temperatures or elevated temperatures, thermoplastic resin sheets or films for forming laminated sheets, wood boards with adhesive coated on their surfaces for forming plywood at elevated temperatures. In this press, the material to be pressed is interposed between upper and lower press plates or die plates and pressed therebetween at either room temperatures or elevated temperatures. It has been desired to effect such a pressing operation in a continuous manner so as to save labor, improve the productivity and achieve a uniformity of the quality of the finished product.

One such continuous press machine employs at least a pair of opposed endless steel belts instead of the above-mentioned pressure plates, each extending around a pair of drums. A material to be pressed is continuously passed between the pair of endless belts, and pressure is put to the material at either room temperatures or elevated temperatures.

The continuous press machine employs a pair of steel belts and a plurality of pairs of upper and lower opposed rollers which are mounted respectively on the back sides of these belts facing away from the material to be pressed between the belts. The pairs of upper and lower opposed rollers put compression pressures to the material through the belts, at a space between the neighboring pairs of rollers, and the belts are in stretched condition, thus imparting a certain degree of pressure to the material between each two adjacent pairs of upper and lower rollers. Alternatively, two groups of small-diameter rollers are mounted respectively on the back sides of the belts and urged to the back surfaces of the belts by flat sheets so as to bring the outer surface of the endless belt into contact with the material. The small-diameter rollers are rotated and thereby move at about a half of the moving speed of the belt. With this apparatus, however, the material to be pressed is subjected to different pressures when it passes through the opposed endless steel belts. In other words, the material is subjected to the pressures of greater magnitude at regions where the belts touch the rollers and also is subjected to pressures of less magnitude at the other regions of the endless belts. In addition, since the pressures which can be applied to the endless belts are limited, the applicable average pressure is only up to several Kg/cm². Therefore, this pressing mechanism can not be applied when a pressure of not less than 10 kg/cm² is needed, in such a case where the material to be pressed produces volatile substance when heated or cured.. And so, it has been necessary to apply a uniform fluid pressure to the back side of each endless belt. In order to produce such a uniform fluid pressure, a pressure chamber is provided in the space defined by each of the endless steel belts and is adapted to hold a fluid under pressure, the pressure chamber having an opening disposed in opposed, slightly spaced relation to the back side surface of each endless belt. In this case, it is necessary to provide seal means for preventing the pressurized fluid in the pressure chamber from leaking through a gap between the pressure chamber and the back side surface of the endless steel belt. For example, Japanese Patent Application Laid Open (Kokai) No. 54-13075 discloses one such seal means which comprises either a flexible seal member or a lubricous solid matter secured to a housing defining the pressure chamber, either of the flexible seal member and the lubricous solid matter being pressed against the endless steel belt so as to prevent the leakage of the pressurized fluid in the pressure chamber through the gap.

In the case where the pressed product must have a smooth surface, in a multi-stage press of the batch type, the material to be pressed is placed between each pair of die plates of stainless steel, aluminum or the like each having a polished working surface. The material is pressed by the die plates at elevated temperatures, so that the polished surface of the die plate is copied to the pressed material. In the case of the continuous pressing, a working surface (i.e., an outer surface) of each endless steel belt must be polished to a mirror surface so that the pressed material has a smooth surface.

In the case of such a continuous pressing, seal means secured to the pressure chamber housing is pressed to the back side surface of the moving endless steel belt (i.e., the surface opposite to the polished surface which is to be in contact with a material to be pressed). The endless steel belt is relatively thin, and therefore when the seal means is pressed into frictional, sliding contact with the back side surface of the steel belt, the polished outer surface of the steel belt is affected. Particularly when foreign matter is jammed between the seal means and the belt, stripe defects develop on the surface of the belt. Also, uneven forces are applied to the back side surface of the steel belt, stripe defects may appear on the polished surface of the steel belt. In addition, other factors, such as a variation in thickness of the steel belt in the direction of its width, an unevenness of the material to be pressed, an undulation of the steel belt in the direction of its width when subjected to tension, a variation in force of pressing of the seal means against the steel belt, deteriorate the polished surface of the steel belt when the steel belt is operated continuously for a long time.

The seal means has a contact portion which is held in contact with the back side surface of the endless steel belt, this contact portion being made of rubber, plastics material or the like so as to achieve a good sealing effect. The contact portion of the seal means is subjected to deterioration upon lapse of time, and as a result, part of the contact portion may be broken off due to the pressure of the pressurized fluid in the pressure chamber, the elevated temperature, and a bulging of the contact portion caused by the pressurized fluid, in which case the broken-off part of the contact portion is jammed in the gap between the back side surface of the endless steel belt and the seal means, so that stripe defect is formed on the steel belt in its longitudinal direction. Thus, the polished outer surface of the steel belt is adversely affected by this stripe defect and can not be used. As described above, with the seal means which is designed to be pressed into frictional sliding contact with the back side surface of the endless steel belt, a satisfactory product has not been obtained.

OBJECT OF THE INVENTION

It is therefore an object of this invention to provide a continuous press machine having an improved seal means whereby the endless steel belt can be positively pressed against a material to be pressed without affecting the working surface thereof.

SUMMARY OF THE INVENTION

According to the present invention, there is provided a continuous press machine which comprises:

(a) a pair of opposed endless belts each operable to move along a looped path, said pair of endless belts having respective inner sides disposed in parallel opposed relation to each other, said opposed inner sides of said endless belts being adapted to hold a sheet-like material therebetween so as to compress and advance it when said endless belts move;

(b) pressure applying means for urging each of said endless belts toward the material, said pressure applying means comprising (i) a stationary housing mounted within said looped path of each of said endless belts, said housing defining a pressure chamber and having a peripheral edge facing and spaced slightly from a back side surface of the inner side of each endless belts, said peripheral edge defining an opening of said pressure chamber disposed in opposed relation to the back side surface of the inner side of each endless belt, and (ii) means for supplying a pressurized urging fluid to each of said pressure chambers, so that the pressure in said pressure chamber is applied to the back side surface of the inner side of each endless belt so as to urge the inner side of each endless belt against the material; and (c) seal means for sealing a gap between said peripheral edge of each housing and the back side surface of the inner side of each endless belt so as to prevent the pressurized urging fluid in the pressure chamber from flowing through said gap, said seal means comprising fluid seal means for continuously applying a pressurized sealing fluid from at least part of said peripheral edge toward the back side surface of the inner side of each endless belt so as to provide a fluid seal therebetween.

DESCRIPTION OF THE PREFERRED EMBODIMENTS OF THE INVENTION

The invention will now be described with reference to the drawings in which like reference numerals denote corresponding parts in the several views.

Figure 1:
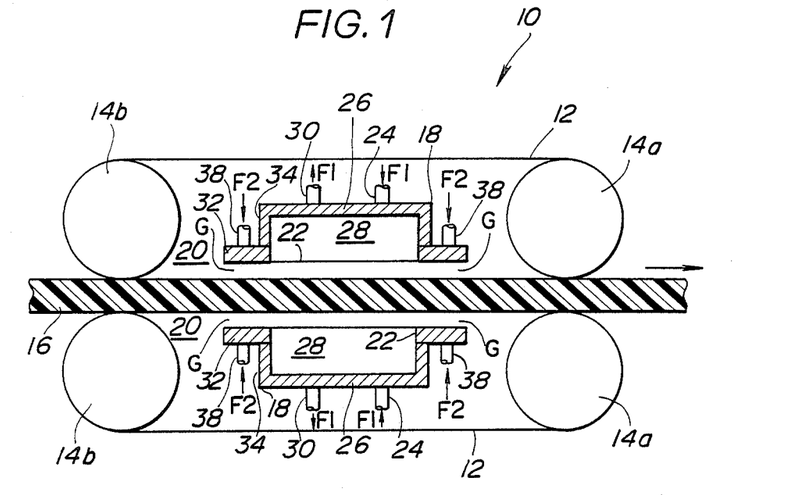
FIG. 1 is a schematic cross-sectional view of a continuous press machine provided in accordance with the present invention.

A continuous press machine 10 shown in FIG. 1 comprises a pair of opposed upper and lower endless steel belts 12 and 12 each extending around a pair of drums 14a and 14b so as to travel or move along respective looped paths. The pair of endless belts 12 have respective inner sides disposed in parallel opposed relation to each other. A material 16 to be processed or pressed passes between the opposed inner sides of the two endless belts 12 to pressed and is advanced in a direction indicated by an arrow in FIG. 1. One of the drums 14a and 14b of each endless belts 12 is operatively connected to a drive means (not shown) such as an electric motor and is driven for rotation about its axis, so that the upper and lower endless belts 12 are moved at the same speed. Only one drum of one of the two belts 12 may be driven for rotation, in which case the other belt is moved through a frictional contact with the moving material 16. The drive drums of the upper and lower endless belts 12 are rotated in the opposite directions.

A pressure-applying means is provided for applying pressure to the back side surface of the inner side of each endless belt 12, so that the working surface of the endless belt 12 is positively urged against the material 16. The pressure-applying means comprises a stationary housing 18 of a rectangular shape and disposed within a space 20 defined by the looped path of each endless belt 12, the housing 18 having an opening 22 facing the back side surface of the inner side of the endless belt 12. The housing may be of any other suitable shape. The pair of housings 18 are held in position by means of hydraulic cylinders, length-adjustable shafts or he like. A first conduit 24 is connected at one end to a source (not shown) of a pressurized urging fluid F1 and is connected at the other end to a wall 26 of each housing 18 so as to supply the pressurized urging fluid F1 to a chamber 28 defined by the housing 18. The two pressure chambers 28 are arranged in opposed relation to each other. A second conduit 30 is connected to the housing wall 26 for discharging the pressurized urging fluid F1 from the pressure chamber 28. Each pressure chamber 28 is filled with the pressurized urging fluid F1 through the first conduit 24 so as to urge the endless belt 12 against the material 16.

Each housing 18 has a peripheral flange 32 (which may be deemed as "peripheral edge") extending around a peripheral wall 34 at its opening 22, and a continuous peripheral groove 36 (shown in FIG. 2) is formed in the peripheral flange 32, the groove 36 opening to the surface of the peripheral flange 32 facing the back side surface of the inner side of the endless belt 12. One ends of conduits 38 are connected to the peripheral flange 32 while the other ends are connected to a source (not shown) of pressurized sealing fluid F2. During the operation of the continuous press machine 10, the pressurized sealing fluid F2, fed from its source, is filled in the peripheral groove 36 and is discharged therefrom toward the back side surface of the inner side of each endless belt 12 so as to provide a fluid seal between the peripheral flange 32 and the back side surface of the inner side of the endless belt, thereby preventing the pressurized urging fluid F1 in each pressure chamber 28 from leaking through a gap G between the peripheral flange 32 and the back side surface of the inner side of the endless belt 12. Thus, each endless belt 12 is moved without contact with the peripheral flange 32 of the housing 18.

Figure 2:
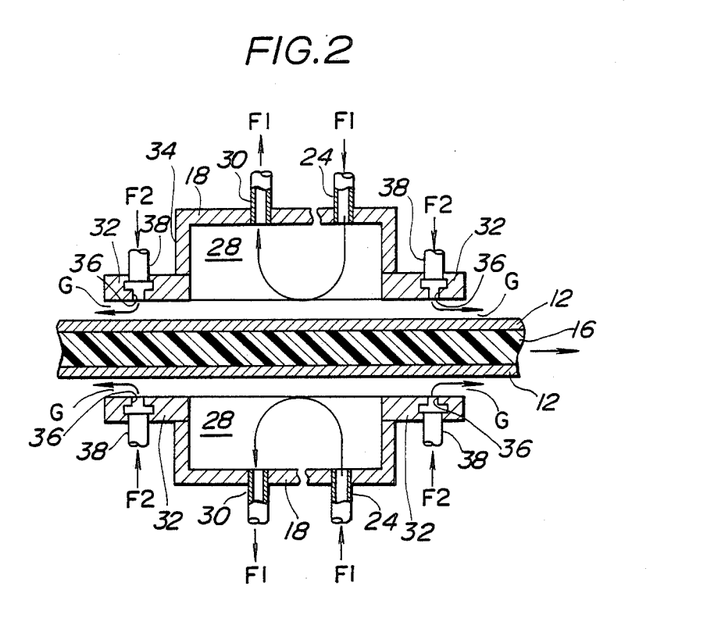
FIG. 2 is a cross-sectional view of pressure-applying means.

Although the gap G between the peripheral flange 32 and the back side surface of the inner side of each endless belt 12 is shown exaggeratedly for illustration purposes, it is preferred that the gap G should be 0.1 μm to 0.3 mm so as to lower the friction between the peripheral flange 32 and the back side surface of the endless belt 12 to a level of fluid friction to reduce a driving force or torque for driving the endless belt 12. More preferably, the gap G should be on the order of 0.1 μm to 0.1 mm.

In this embodiment, although the groove 36 is provided around the entire peripheral flange 32 so as to provide the continuous fluid seal between the peripheral flange 32 and the back side surface of each endless belt 12, two separate grooves may be provided respectively in the front and rear portions of the peripheral flange 32 disposed transversely of a path of travel of the sheet-like material 16. In this case, two separate seal members of rubber or the like are secured to the opposite lateral side portions of the peripheral flange 32 disposed parallel to and longitudinally of the path of travel of material 16 and are held in sliding contact with the back side surface of the inner side of each endless belt 12 so as to seal the gap G in cooperation with the fluid seals applied from the two separate grooves. Thus, in this case, the two separate seal members are held in sliding contact with the opposite lateral edges of the sheet-like material 16. However, these opposite lateral edges of the final product do not need to be so smooth as the central portion of the final product between these lateral edges since the opposite lateral edges are cut off for trimming.

Although the pressurized urging fluid F1 and the pressurized sealing fluid F2 can be a gas, it is preferred that they should be incompressible fluid such as, for example, water, hydraulic oil, lubricating oil, water soluble polymer solution, or molten salt. Hydraulic mineral oil, silicone oil and water soluble polymer solution such as polyethylene glycol aqueous solution are most preferred. The urging fluid F1 and the sealing fluid F2 can be either the same type of fluid or different types of fluids.

The rate of flow of the sealing fluid F2 from the groove 36 is determined depending on the pressure in the pressure chamber 28, the size of the gap G, the viscosity of the sealing fluid F2 and the conditions of the surfaces of the peripheral flange 32 and back side surface of the endless belt 12. Preferably, the sealing fluid F2 should have a viscosity of 100-3,000 cSt (centistokes).

The drums 14a, 14b may be of the heater-installed type, and a preheater such as a far-infrared irradiating device and a heating plate may be mounted within the space 20 and interposed between the drum 14b and the housing 18, so that the material 16 is preheated. Either heating means or cooling means may be provided in either the urging fluid source or the pressure chamber 28 so as to heat or cool the urging fluid F1.

Figure 3:
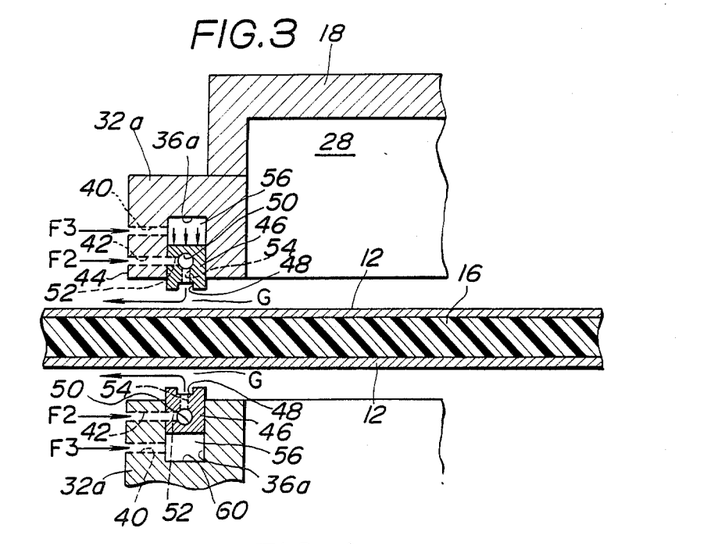
FIG. 3 is a cross-sectional view of a modified fluid seal means.

FIG. 3 shows a modified fluid seal means which will now be described. In this embodiment, a continuous peripheral groove 36a of a rectangular cross-section is formed in the peripheral flange 32a of each housing 18 and extends along the entire periphery of the peripheral flange 32a, so that the peripheral flange 32a has a channel-shaped cross-section, the peripheral groove 36a opening to the surface of the peripheral flange 32a facing the back side surface of the inner side of each endless belt 12. A pair of first and second holes 40 and 42 are formed through an outer wall 44 of the peripheral flange 32a so as to lead to the interior of the groove 36a. Four floating members or bars 46 are received respectively in four portions of the groove 36a provided respectively in the front, rear and two side portions of the peripheral flange 32a, the four floating members 46 being disposed in contiguous relation to each other at their ends. Each of the four floating members 46 is received in the groove 36a for sliding movement in the direction of the depth of the groove 36a, that is, toward and away from the back side surface of the inner side of each endless belt 12. Each of the floating members 46 is of a square cross-section and has a longitudinal recess 48 formed in one face directed toward the back side surface of each endless belt 12, the recess 48 extending along the entire length thereof. Each floating member 46 has an internal bore 50 formed axially therethrough, and has a slot or opening 54 formed therein and extending along the entire length thereof, the slot 54 extending from the internal bore 50 to the recess 48. The internal bores 50 of the four floating members 46 communicate with one another. Each of the four floating members 46 has an aperture 52 formed therein and extending between one side face thereof and the internal bore 50. Alternatively, one of the four floating members 46 may have an aperture 52.

A space 56 is defined by an inner portion of each groove 36a and an inner face of the floating member 46. The first hole 40 in the peripheral flange 32a communicates with the space 56, and a source (not shown) of pressurized urging fluid F3 is connected to the first hole 40 so as to supply the pressurized fluid F3 to the space 56 via the first hole 40, thereby urging each floating member 46 toward the back side surface of the inner side of the endless belt 12. Thus, the pressurized fluid F3 filled in the space 56 serves as urging means for urging the floating member 46 toward the back side surface of the inner side of the endless belt 12.

The second hole 42 in the peripheral flange 32a communicates with the aperture 52 in the floating member 46, and the second hole 42 is connected to a source of pressurized sealing fluid F2, as described in the preceding embodiment, so as to supply the sealing fluid F2 to the internal bore 50 of the floating member 46. With this arrangement, the pressurized sealing fluid F2 is discharged from the slot 54 of each floating member 46 toward the back side surface of the inner side of each endless belt 12 so as to provide a fluid seal at the gap G to prevent the pressurized urging fluid F1 from leaking through the gap G, as described above for the preceding embodiment. The pressure in the space 56 and the pressure of the sealing fluid F2 discharged from the slot 54 are so determined that each floating member 46 is held in floating condition (FIG. 3) and is spaced from the back side surface of the inner side of each endless belt 12 by a constant distance, for example, of 0.1 μm to 0.3 mm.

The floating member 46 can be made of any suitable material so long as it will not damage the surfaces of the groove 36a when the floating member slidingly moves in the groove 36a toward and away from the back side surface of the inner side of the endless belt 12. For example, the floating member 46 can be made of engineering plastics material such as polyimide, polysulfone, polyether ether ketone and polyacrylate, fluorocarbon resin, silicone resin, rubber, graphite, soft metal, or composite materials.

When the continuous press machine 10 is in its inoperative condition, the upper floating members 46 (FIG. 3) are held against the back side surface of the inner side of the upper endless belt 12 under the influence of gravity, whereas the lower floating members 46 are held against the bottom surfaces 60 of the lower continuous peripheral groove 36a. The sizes of the second hole 42, aperture 52 and gap G and the depth of the groove 36a are so determined that the communication between the hole 42 and the aperture 52 is maintained even in this condition.

Each endless steel belt 12 is relatively thin and so flexible that if the surface of the material 16 is undulated, the inner side of the endless belt held in contact with the undulated surface of the material 16 becomes correspondingly undulated. With the fluid seal means of FIG. 3, if either surface of the material 16 is undulated, the two floating members 46, received respectively in the front and rear portions of the rectangular groove 36a disposed transversely of the path of travel of the material 16, are slidingly moved in the direction of the depth of the groove 36a in accordance with the undulations of the material 16 when the material 16 passes between the two endless belts 12, thereby maintaining the distance between each of the two floating members 46 and the back side surface of the inner side of each endless belt 12 constant. More specifically, if a bulged or raised portion on the surface of the material 16 passes past the floating member 46, the floating member 46 slidingly moves in the groove 36a in a direction away from the material 16 against the urging force applied by the pressurized fluid F3 in the space 56. On the other hand, if a depressed portion on the surface of the material 16 passes past the floating member 46, the floating member 46 slidingly moves in the groove 36a in a direction toward the material 16.

In this embodiment, although the groove 36a is provided around the entire peripheral flange 32a, two separate grooves may be provided respectively in the front and rear portions of the peripheral flange 32a disposed transversely of a path of travel of the sheet-like material 16, and two floating members 46 are slidably received in the two grooves, respectively. In this case, two separate seal members of rubber or the like are secured to the opposite lateral side portions of the peripheral flange 32a disposed parallel to and longitudinally of the path of travel of the material 16 and are held in sliding contact with the back side surface of the inner side of each endless belt 12 so as to seal the gap G in cooperation with the fluid seals applied from the two floating members 46.

Figure 4:
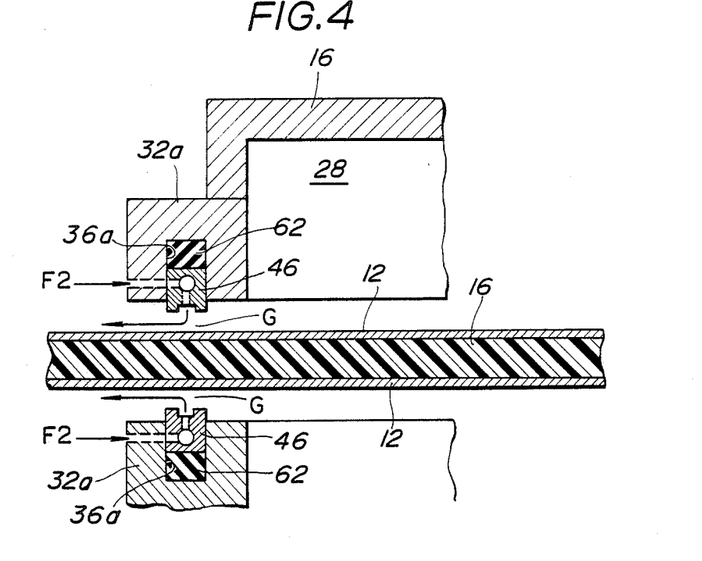
FIG. 4 is a view similar to FIG. 3 but showing another modified fluid seal means.

FIG. 4 shows another modified fluid seal means which differs from the fluid seal means of FIG. 3 in that instead of the urging fluid F3, the urging means comprises a resilient member 62 accommodated in the space 56. The resilient member 62 which urges the floating members 46 toward the back side surface of the inner side of each endless belt 12 can be an elastic member or a suitable spring.

Figure 5:
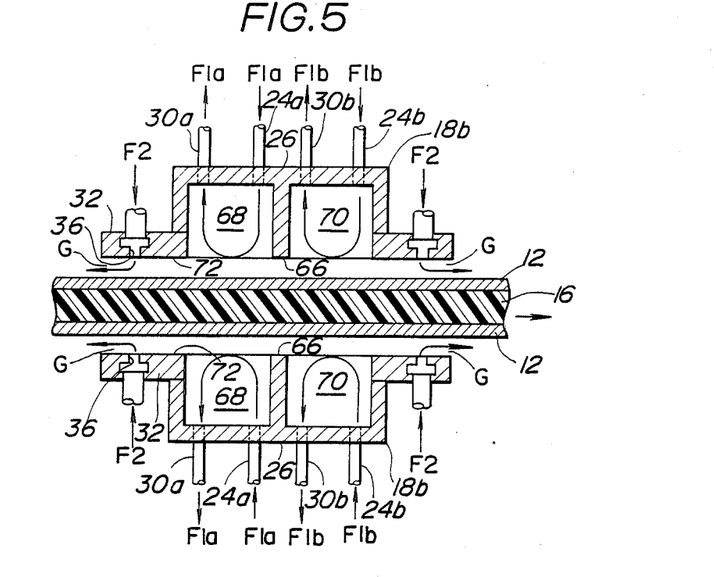
FIG. 5 is a cross-sectional view of a modified pressure applying means.

FIG. 5 shows a modified pressure applying means for applying pressure to the back side surface of the inner side of each endless belt 12. The pressure applying means in this embodiment differs from the pressure applying means of FIGS. 1 and 2 in that a housing 18b has a partition wall 66 extending between the opposite side walls (not shown) of the housing 18 to divide the interior of the housing 18b into first and second compartments (pressure chambers) 68 and 70 spaced along the path of travel of the material 16. The partition wall 66 extends from the wall 26 to a plane in which the inner surface 72 of the peripheral edge 32 lies. A pressurized heating fluid F1a is supplied into each first compartment 68 via a conduit 24a and is discharged therefrom via a conduit 30a. Similarly, a pressurized cooling fluid F1b is supplied into each second compartment 70 ia a conduit 24b and is discharged therefrom via a conduit 30b. With this arrangement, when the material 16 passes between the opposed upper and lower first compartments 68, the material 16 is heated to a predetermined temperature, and subsequently is cooled when the material 16 passes between the opposed upper and lower second compartments 70. This embodiment is particularly suited for processing a plurality of thermoplastic films into a laminated construction. In this case, the plurality of thermoplastic films are heated and fused together into a laminated form when passing between the opposed first pressure chambers 68.

Preferably, the pressurized cooling fluid F1b should be water, and the pressurized heating fluid F1a should be emulsion-resistant oil which can be easily separated from the cooling water F1b. The reason for this will now be described. Generally, when fluid flows along a flat plate, the following formula (1) is established where Reynolds number is less than 80,000:

$$h \propto k^{2/3}/\mu^{1/6} \qquad (1)$$

wherein h is heat transfer coefficient (Kcal/m$^2$·hr·°C.), k is thermal conductivity (Kcal/m·hr·°C.), and u is coefficient of kinematic viscosity (cSt: centistokes).

The thermal conductivity k and kinematic viscosity coefficient $\mu$ of oil and water are indicated in Table below.

TABLE

| | Thermal conductivity (k) | Coefficient of Kinematic Viscosity ($\mu$) | | |
|---|---|---|---|---|
| | | 40° C. | 100° C. | 200° C. |
| oil | 0.1 | 150 cSt | 15 cSt | 3 cSt |
| water | 0.5 | 0.7 cSt | 0.3 cSt | — |

As will be appreciated from the formula (1) and the Table, if the heating fluid F1a and the cooling fluid F1b are the same oil and if these two fluids are 200° C. and 40° C., respectively, the heat transfer coefficient on the cooling side is lowered to about a half of the heat transfer coefficient on the heating side. As a result, the cooling ability is lowered.

On the other hand, if the cooling fluid F1b is water, the heat transfer coefficient h becomes about seven times as high as that of the oil, since the thermal conductivity k of the water is five times higher and the kinematic viscosity $\mu$ is 1/200. Therefore, the cooling ability is enhanced.

The heating fluid F1a and the cooling fluid F1b are mixed together in a small amount since the partition wall 66 is not held in sealing contact with the back side surface of the inner side portion of each endless belt 12. Therefore, it is preferred that the demulsible oil should be used in order that the mixed fluids can be easily separated from each other and recovered. A fluid seal may be applied to a gap between the partition wall 66 and the belt 12.

Figure 6:
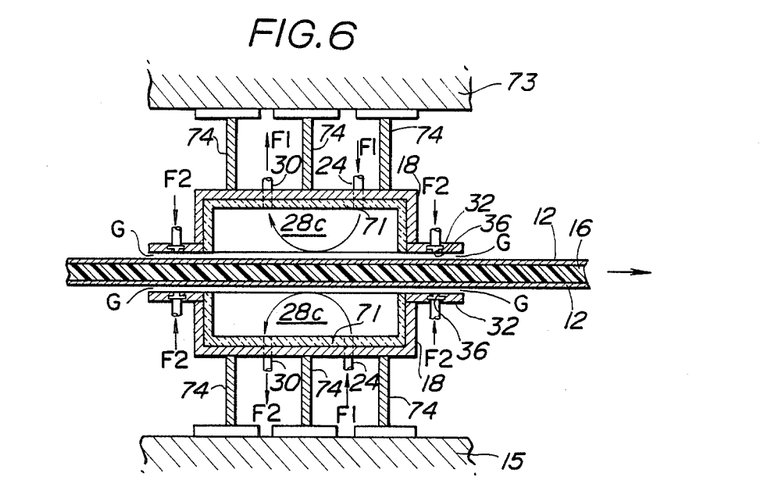
FIGS. 6 and 7 are views similar to FIG. 2 but showing respective modified pressure-applying means.

FIG. 6 shows another modified pressure applying means which differs from the pressure applying means of FIG. 1 in that each housing 18 is lined with a thermal insulating material 71. Thus, the inner surface of the housing 18 is entirely covered with the thermal insulating layer 71, so that the pressure chamber 28c is defined by the thermal insulating layer 71. The thermal insulating layer 71 is made, for example, of polytetrafluoroethylene, polyimide or wood. Each housing 18 is fixed to a stationary frame 73 through support members 74. With this construction, each housing 18 is thermally insulated from the pressure chamber 28c. If there is not provided the thermal insulating layer 71, a temperature difference between the housing 18 and the frame 73 develops in the case where the pressure chamber 28c holds either hot or cold fluid F1. As a result, there are occasions when the parts or portions of the apparatus are subjected to deformation due to thermal expansion differences. In this case, the strength of the frame 73 is usually higher than that of the housing 18, and the pressure chamber 28c is subjected to distortion. As a result, the distance between the peripheral edge 32 of the housing 18 and the back side surface of the inner side of the endless belt 12 is varied, so that a satisfactory fluid seal afforded by the sealing fluid F2 is not achieved. In this embodiment, however, the housing 18 is lined with the thermal insulating layer 71 so as to thermally insulate the housing 18 from the pressure chamber 68c. Therefore, even if the fluid F1 of elevated temperatures is supplied to the pressure chamber 28c, the housing 18 is kept to a relatively low temperature. Thus, the temperature difference between the housing 18 and the frame 73 is maintained small. Therefore, the above undesirable conditions are positively prevented. In addition, since the temperature in the pressure chamber 28c reaches a predetermined level relatively quickly, the start-up period of the press machine becomes short. Further, the thermal insulating layer 71 enables energy-saving.

Figure 7:
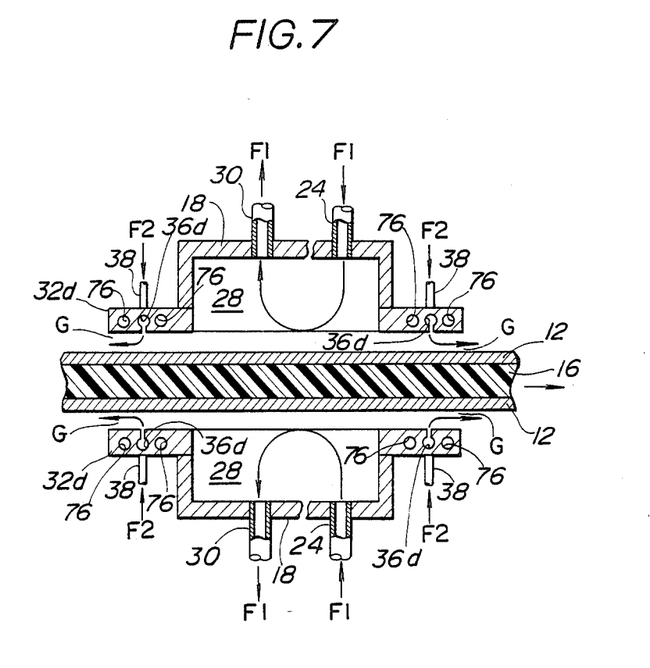

FIG. 7 shows a further modified form of the invention in which there is provided cooling means for cooling the pressurized sealing fluid F2 so as to keep the viscosity of the sealing fluid F2 to a predetermined level. More specifically, a continuous passageway 36d is formed through the peripheral flange 32d of the housing 18d and extending along the entire periphery thereof. The passageway 36d opens toward the back side surface of the inner side of each endless belt 12 so as to apply the sealing fluid F2 thereto, as described above for the preceding embodiments. Two passageways 76 are formed through the peripheral flange 32d and extend along the entire periphery thereof, the two passageways 76 being disposed on opposite sides of the passageway 36d. A circulating coolant such as water is supplied to the two passageways 76 so as to cool the sealing fluid F2. It is preferred that the friction between the peripheral flange 32d and the back side surface of the inner side of each endless belt 12 should be reduced to a level of fluid friction so as to reduce a drive force or torque for moving the endless belt 12. To achieve this, it is necessary that the gap G between the peripheral flange 32d and the back side surface of the inner side of the endless belt 12 should be not less than 0.1 $\mu$m. Therefore, in order to keep constant the flow rate of the sealing fluid F2 from the passageway 32d, it is desirable that the viscosity of the sealing fluid F2 should be kept relatively high. The coolant passing through the passageways 76 cools the sealing fluid F2 so that the sealing fluid F2 has the desired viscosity.

In this embodiment, although the groove 36d and the two passageways 76 are provided around the entire peripheral flange 32d, the groove 36d and the two passageways 76 may be omitted at the lateral opposite side portions of the peripheral flange 32d. In this case, two separate seal members of rubber or the like are secured to the opposite lateral side portions of the peripheral flange 32a disposed parallel to and longitudinally of the path of travel of material 16 and are held in sliding contact with the back side surface of the inner side of each endless belt 12 so as to seal the gap G in cooperation with the fluid seals formed by the sealing fluid F2.

With the press machines described above, the material 16 can be pressed at a high pressure of up to 100 kg/cm$^2$, and besides the material 16 is subjected to a uniform pressure. Further, since the fluid seal is employed, the endless belts are not subjected to abrasion and damage, so that the resultant pressed material has a good quality.

It is preferred that the opposed pressure chambers are connected to the same source of the pressurized urging fluid. If the opposed pressure chambers are connected respectively to separate fluid sources, the opposed endless belts may undergo different fluid pressures, so that the endless belts are bent or deformed. In addition, where the fluid is of the incompressible type, the pressure difference between the opposed pressure chambers can be kept to almost zero.

While the continuous press machines according to the present invention have been specifically shown and described herein, the invention itself is not to be restricted by the exact showing of the drawings or the description thereof. For example, although only one pair of opposed endless belts 12 are used in the illustrated embodiments, more than one pair of opposed endless belts can be arranged along the path of travel of the material 16. Also, the opposed endless belts do not need to have the same length, and for example, a longer endless belt may be arranged on one side of the path of travel of the material while a plurality of shorter endless belts are arranged along this travel path in opposed relation to the longer endless belt.

What is claimed is:

1. A continuous press machine comprising:
   (a) a pair of opposed endless belts each operable to move along a looped path, said pair of opposed endless belt having respective inner sides disposed in parallel opposed relation to each other, said inner sides of said endless belts being adapted to hold a sheet-like material therebetween so as to compress and advance it when said pair of opposed endless belts move;
   (b) pressure applying means for urging each of said pair of opposed endless belts towards the material, each of said pressure applying means comprising:
      (i) a stationary housing mounted within said looped path of the corresponding one of said pair of opposed endless belts, said stationary housing defining a pressure chamber and having a peripheral edge facing and spaced slightly from a back side surface of the inner side of the corresponding one of said pair of opposed endless belts, said peripheral edge defining an opening of said pressure chamber disposed in opposed relation to the back side surface of the inner side of the corresponding one of said pair of opposed endless belts, and
      (ii) means for supplying a pressurized urging fluid to said pressure chamber, so that the pressure in said pressure chamber is applied to the back side surface of the inner side of the corresponding one of said pair of opposed endless belts so as to urge the inner side of the corresponding one of said pair of opposed endless belts against the material; and (c) seal means for sealing a gap between said peripheral edge of each one of said stationary housings and the back side surface of the inner side of the corresponding one of said pair of opposed endless belts so as to prevent the pressurized urging fluid in the corresponding one of said pressure chambers from flowing through said gap, said seal means being provided on said peripheral edge of each one of said stationary housing and being spaced from the back side surface of the inner side of the corresponding one of said pair of opposed endless belts by a gap of 0.1 μm to 0.3 mm, aid seal means comprising fluid seal means for continuously applying a pressurized sealing fluid from at least part of said peripheral edge toward the back side surface of the inner side of the corresponding one of said pair of opposed endless belts so as to provide a fluid seal therebetween.

2. A continuous press machine according to claim 1, in which said peripheral edge of each housing has a pair of transverse portions disposed transversely of a path of travel of the material and spaced from each other along said travel path, said sealing fluid being applied from said transverse portions of said peripheral edge toward the back side surface of the inner side of each endless belt.

3. A continuous press machine according to claim 1, in which:
  (a) said peripheral edge of each housing has a groove formed at said at least part thereof and opening toward the back side surface of the inner side of the corresponding one of said pair of opposed endless belts;
  (b) an elongated floating member is received in each of said grooves for sliding movement toward and away from the back side surface of the inner side of the corresponding one of said pair of opposed endless belts;
  (c) urging means are accommodated within a space defined by each of said grooves and the corresponding one of said floating members so as to urge the corresponding one of said floating members toward the back side surface of the inner side of the corresponding one of said pair of opposed endless belts;
  (d) each one of said floating members has a passage way to which the pressurized sealing fluid is supplied; and
  (e) each of said passageways has an opening facing the back side surface of the inner side of the corresponding one of said pair of opposed endless belts so as to discharge the pressurized sealing fluid from the corresponding one of said openings toward the back side surface of the inner side of the corresponding one of said pair of opposed endless belts, so that the corresponding one of said floating members is slidingly moved in the corresponding one of said grooves away from said back side surface against the bias of said urging means.

4. A continuous press machine according to claim 3, in which said urging means comprises a pressurized fluid.

5. A continuous press machine according to claim 3, in which said urging means comprises a resilient member.

6. A continuous press machine according to claim 1, in which said gap is 0.1 μm to 0.1 mm.

7. A continuous press machine according to claim 1, in which the pressurized urging fluid is incompressible fluid.

8. A continuous press machine according to claim 1, in which said pressure applying means further comprises means for heating the pressurized urging fluid.

9. A continuous press machine according to claim 1, in which:
  (a) at least one of said pressure chambers is divided into a plurality of compartments arranged along the path of travel of the material and
  (b) said means for supplying a pressurized urging fluid supplies a separate pressurized fluid to each of said plurality of compartments.

10. A continuous press machine according to claim 9, in which said pressure applying means further comprises:
  (a) means for heating at least one of the separate pressurized fluids and (b) means for cooling at least one of the other separate pressurized fluids.

11. A continuous press machine according to claim 8, in which at least one of said housings is lined with a thermal insulating member, said thermal insulating member defining the corresponding one of said pressure chambers.

12. A continuous press machine according to claim 9 wherein:
  (a) each of said pressure chambers is divided into a plurality of compartments arranged along the path of travel of the material and
  (b) said means for supplying a pressurized urging fluid supplies a separate pressurized fluid to each of said plurality of compartments.

13. A continuous press machine comprising:
  (a) a pair of opposed endless belts each operable to move along a looped path, said pair of opposed endless belts having respective inner sides disposed in parallel opposed relation to each other, said inner sides of said endless belts being adapted to hold a sheet-like material therebetween so as to compress and advance it when said pair of opposed endless belts moves;
  (b) pressure applying means for urging each of said pair of opposed endless belts toward the material, each of said pressure applying means comprising:
    (i) a stationary housing mounted within said looped path of the corresponding one of said pair of opposed endless belts, said stationary housing defining a pressure chamber and having a peripheral edge facing and spaced slightly from a back side surface of the inner side of the corresponding one of said pair of opposed endless belts, said peripheral edge defining an opening of said pressure chamber disposed in opposed relation to the back side surface of the inner side of the corresponding one of said pair of opposed endless belts, and
    (ii) means for supplying a pressurized urging fluid to said pressure chamber, so that the pressure in said pressure chamber is applied to the back side surface of the inner side of the corresponding one of said pair of opposed endless belts so as to urge the inner side of the corresponding one of said pair of opposed endless belts against the material;
  (c) seal means for sealing a gap between said peripheral edge of each one of said stationary housings and the back side surface of the inner side of the corresponding one of said pair of opposed endless belts so as to prevent the pressurized urging fluid in the corresponding one of said pressure chambers from flowing through said gap, said seal means being provided on said peripheral edge of each one of said stationary housings and being spaced from the back side surface of the inner side of the corresponding one of said pair of opposed endless belts by a gap of 0.1 μm to 0.3 mm, said seals means comprising fluid seal means for continuously applying a pressurized sealing fluid from at least part of said peripheral edge toward the back side surface of the inner side of the corresponding one of said pair of opposed endless belts so as to provide a fluid seal therebetween; and (d) cooling means provided at said at least part of said peripheral edge of said housing for cooling the pressurized sealing fluid to keep its viscosity to a predetermined level.

* * * * *